(12) United States Patent
Boutaghou et al.

(10) Patent No.: US 7,151,649 B2
(45) Date of Patent: Dec. 19, 2006

(54) ARM-SUSPENSION-PIVOT BEARING INTEGRAL DESIGN

(75) Inventors: Zine-Eddine Boutaghou, Vadnais Heights, MN (US); Joel David Limmer, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 490 days.

(21) Appl. No.: 10/358,831

(22) Filed: Feb. 5, 2003

(65) Prior Publication Data

US 2003/0231433 A1    Dec. 18, 2003

Related U.S. Application Data

(60) Provisional application No. 60/387,986, filed on Jun. 12, 2002.

(51) Int. Cl.
*G11B 5/55* (2006.01)

(52) U.S. Cl. ............... 360/264.1; 360/264.3; 360/264.7; 360/265.7; 360/265.9

(58) Field of Classification Search ............... 360/264, 360/264.1, 264.3, 264.7, 264.9, 265, 265.7, 360/265.8, 265.9, 266.1, 266.2, 266.4, 266.8, 360/266.9
See application file for complete search history.

(56) References Cited

U.S. PATENT DOCUMENTS

| | | | |
|---|---|---|---|
| 4,716,478 A | 12/1987 | Walsh et al. ............... 360/104 |
| 4,789,914 A | 12/1988 | Ainslie et al. ............. 360/103 |
| 5,214,552 A * | 5/1993 | Haga ........................ 360/264.7 |
| 5,251,082 A * | 10/1993 | Elliott et al. ............. 360/264.3 |
| 5,666,243 A | 9/1997 | Brent ......................... 360/106 |
| 5,668,684 A | 9/1997 | Palmer et al. ............. 360/106 |
| 5,731,931 A | 3/1998 | Goss ........................... 360/104 |
| 5,734,525 A | 3/1998 | Girard ........................ 360/104 |
| 5,768,050 A * | 6/1998 | Cho ........................ 360/264.7 |
| 5,854,721 A | 12/1998 | Lim ........................... 360/106 |
| 5,872,687 A | 2/1999 | Arya et al. ................. 360/104 |
| 5,892,637 A | 4/1999 | Brook, Jr. et al. .......... 360/104 |
| 5,966,269 A | 10/1999 | Marek et al. ............... 360/104 |
| 6,018,441 A | 1/2000 | Wu et al. .................... 360/106 |
| 6,055,133 A | 4/2000 | Albrecht et al. ............ 360/104 |
| 2004/0257710 A1 * | 12/2004 | Limmer et al. .......... 360/264.3 |

* cited by examiner

*Primary Examiner*—R. S. Tupper
(74) *Attorney, Agent, or Firm*—John D. Veldhuis-Kroeze; Westman, Champlin & Kelly, P.A.

(57) ABSTRACT

A solid-state actuation mechanism for use in a data storage system. The actuation mechanism includes an anchor fixedly attached to a housing of the data storage system, a spring member including a first end coupled to the anchor, a suspension coupled to a second end of the spring member, the suspension supporting a data head above a media surface, the suspension being biased by the spring member toward a first position, and an actuation component coupled to the suspension. The actuation component configured to apply an actuation force to the suspension to move the suspension laterally relative to the media surface.

29 Claims, 11 Drawing Sheets

ARM-SUSPENSION-PIVOT BEARING INTEGRAL DESIGN

CROSS-REFERENCE TO RELATED APPLICATION

This application claims priority from U.S. Provisional Application 60/387,986 filed on Jun. 12, 2002 for inventors Zine-Eddine Boutaghou and Joel David Limmer and entitled ARM-SUSPENSION-PIVOT BEARING INTEGRAL DESIGN.

FIELD OF THE INVENTION

The present invention relates generally to actuators, and more particularly but not by limitation to actuators for supporting and moving a data head over a media surface.

BACKGROUND OF THE INVENTION

Computers generally require a media in which digital data can be stored and retrieved. Magnetizable (hard) layers on discs have proven to be a reliable media for data storage and retrieval. However, other types of disc drives, such as optical disc drives, are also frequently used. Disc drives that read data from and write data to hard discs have become popular components of computer systems.

To access a memory location or data block on a hard disc a read/write head is positioned above the surface of the disc while the disc rotates at an essentially constant velocity. By moving the read/write head radially over the rotating disc, all memory location on the disc can be accessed. This is typically referred to as "flying" because the head is coupled to a slider that is hydrodynamically configured to hover over the surface of the disc on a cushion of air.

In a conventional disc drive, multiple discs are coupled to and rotate about a spindle. Each of the discs has two substantially flat surfaces that are capable of storing data. Typically these discs are stacked in a parallel relationship with each other. The heads are designed to move within the space between adjacent discs while flying close to the disc surface. The head is coupled to the distal end of a thin, arm-like structure called a head suspension assembly (HSA), which is inserted within the space between two adjacent discs. This HSA is made of materials and thickness so as to be somewhat flexible and to allow a measure of vertical positioning as the head hovers over the surface of the rotating disc.

Typically, HSAs are mounted and supported by an actuator arm. An actuator arm is selectively positionable by a rotary actuator assembly over a selected data track or data block of the disc to either read data from or write data to a selected data block. Historically, this actuator assembly has assumed many forms, with most disc drives of the current generation incorporating an actuator of a type referred to as a rotary voice coil actuator. Typically the rotary voice coil actuator consists of a pivot attached to a drive housing of the disc drive. A shaft is mounted and set such that its central axis is normal to the plane of rotation of the disc. An actuator housing is pivotally mounted to the pivot shaft and supports a coil which is supported in a magnetic field generated by an array of permanent magnets. When controlled direct current is applied to the coil, an electromagnetic field is formed which interacts with the magnetic field of the permanent magnet that is in proximity to the coil. This causes rotation of the actuator housing in accordance with the well-known Lorentz relationship. As the actuator housing rotates, the read/write head is moved radially across the data tracks on the disc. Control of the movement of the head from track to track on the disc surface is commonly accomplished through the use of the closed loop servo system. When an access command is sent to the disc drive, a comparison is made between the current position of the head relative to the disc and the location of the desired data transfer on the disc. If the head is currently positioned over the desired track, the disc drive simply waits for the correct circumferential location to rotate under head, and then begins the requested data transfer. If however this transfer is to take place at a location other than the present position of the actuator, servo logic determines both the distance and direction that the actuator must move in order to bring the head over the target track. Based on this determination, servo logic applies controlled direct current to the coil of the actuator voice coil motor, which causes the actuator to move from the current track location to the desired target track.

A conventional prior art actuator requires a large number of components from a mechanical and electrical viewpoint. As there are a number of components in the actuator the time and effort required to assemble the actuator is very high. Further, each actuator needs to be tested to ensure that it will properly operate and in order to determine a relatively acceptable yield of the group of actuators thus adding to the time required to manufacture the drive. This testing and assembly results in a relatively high cost for assembling the actuator for use in a disc drive. Therefore, there is a desire for a low cost system that can be achieved by optimizing the supply chain process or targeting a design point to achieve a 100% yield across all of the components without a test.

Embodiments of the present invention provide solutions to these and other problems, and offer other advantages over the prior art.

SUMMARY OF THE INVENTION

In summary one embodiment of the present invention is directed to a solid-state actuation mechanism for use in a data storage system. The actuation mechanism includes an anchor, a spring member including a first end coupled to the anchor, and a suspension coupled to a second end of the spring member. The anchor is fixedly attached to a housing of the data storage system. The suspension supports a data head above a media surface, and is biased by the spring member toward a first position. Further, an actuator component is coupled to the suspension. The actuator component is configured to apply an actuation force to the suspension to move the suspension laterally relative to the media surface. The spring member of the actuation mechanism can include two arms extending from the anchor to the suspension. The two arms are spaced apart from each other, and are configured to bend laterally relative to the media surface in response to the applied actuation force.

Another embodiment of the present invention is directed to a method of moving a data head laterally relative to a media surface. The method includes providing a solid state actuation mechanism. The actuation mechanism has an anchor fixedly attached to a housing of a data storage system, a spring member having a first end coupled to the anchor, and a suspension coupled to a second end of the spring member. The suspension supports the data head above the media surface. The method further includes biasing the suspension toward a first position using the spring member, and applying an actuation force to the suspension to move the suspension and the data head from the first position laterally relative to the media surface.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
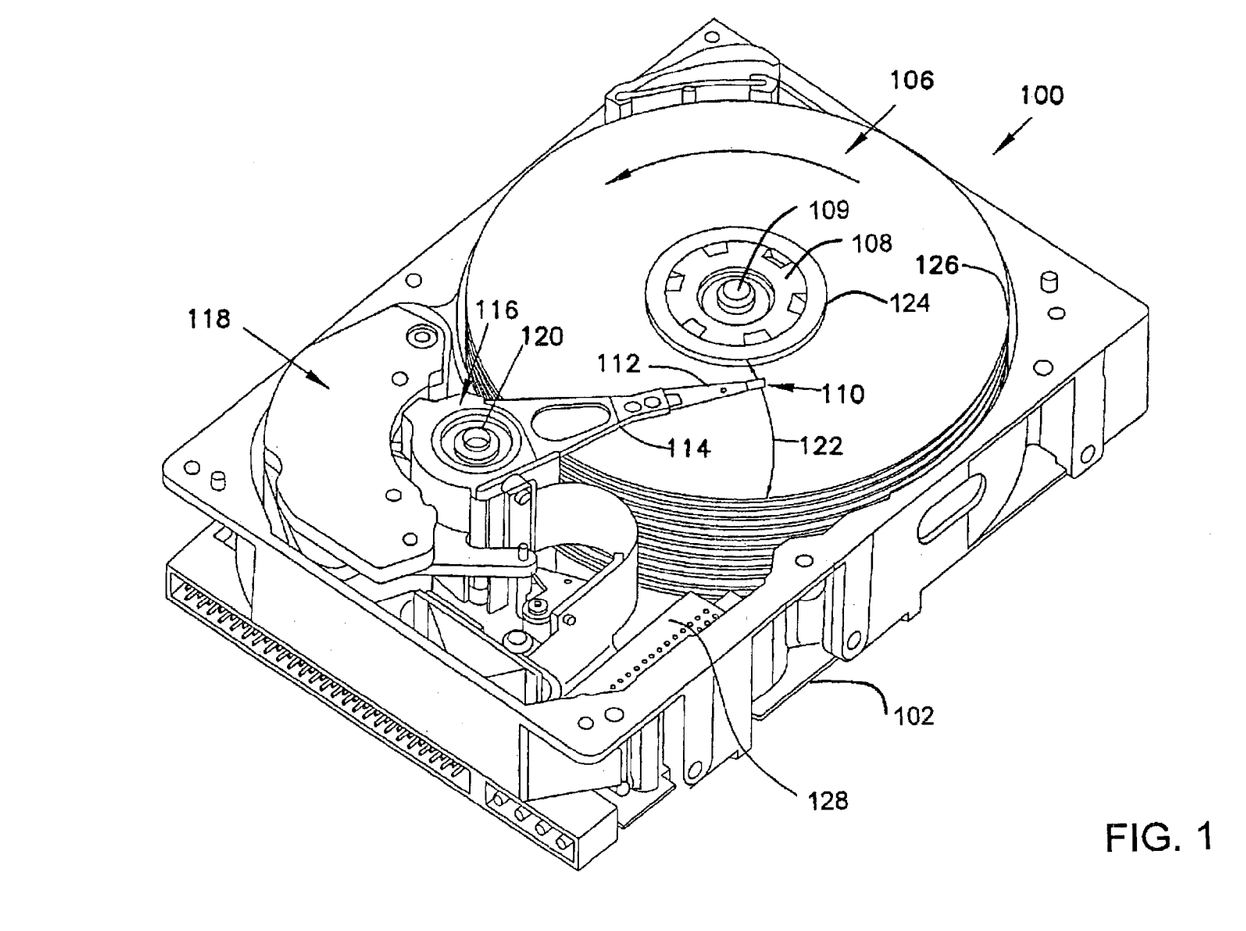
FIG. 1 is an isometric view of a disc drive.

FIG. 1 is an isometric view of a disc drive 100. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 128 based on signals generated by heads 110 and a host computer (not shown). It should be noted at this time that while disc drive 100 is shown with rotary actuator 116, a disc drive 100, as configured in FIG. 1, can be used with a non-rotary actuator of the present invention as described in FIGS. 3–7. Therefore, the present invention includes a disc drive having a non-rotary actuator in accordance with the following disclosure.

Figure 2:
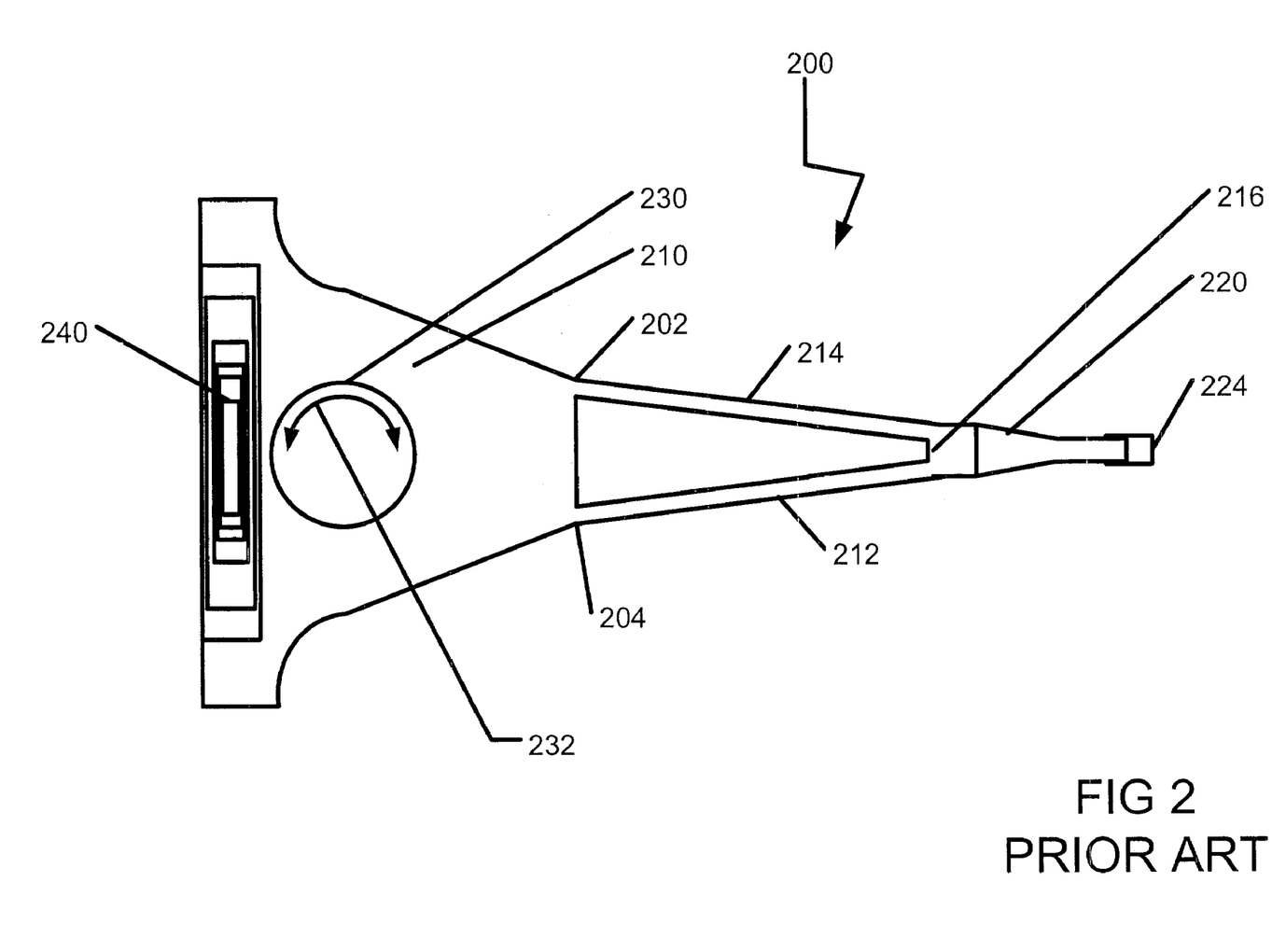
FIG. 2 is a diagrammatic illustration of a PRIOR ART actuator.

FIG. 2 is a diagrammatic illustration of a PRIOR ART actuator 200. Actuator 200 comprises a head assembly 220, arms or beams 214, 212, an actuation component 240, an anchor 210 and a pivot area 230. Actuation component 240 is attached or fabricated to one side of pivot area 230 and is illustrated as a voice coil. Pivot area 230 is located in a portion of anchor 210 such that anchor 210 can rotate around or about pivot area 230 as shown by arrow 232. On the side opposite of pivot area 230, arms 212 and 214 extend from a first end 202, 204 of anchor 210. Head assembly 220 is connected to a second end of arms 214 and 212 at a connection area 216. Head assembly 220 supports a data head 224 over a media surface.

Typically, actuator 200 is used to move data head 224 from one track to another track (not illustrated) to access a data block. Actuator 200, as illustrated in FIG. 2, is an actuator commonly known as a rotary voice coil actuator. Actuator 200 is mounted to a disc drive housing at pivot area 230 by a pivot shaft (not illustrated) such that a central access of the pivot shaft is normal to the plane of rotation of disc 106. Actuator 200 is mounted to the pivot shaft by an arrangement of precision ball-bearing assemblies, and the pivot shaft supports the coil which is suspended in a magnetic field of an array of permanent magnets (also not shown), which are fixedly mounted to the disc drive housing.

To rotate actuator 200 a controlled DC current is applied to coil Is 240 via a controller 128 (FIG. 1). This results in a magnetic field formed surrounding coil 240 that interacts with the magnetic field of the permanent magnets. This interaction causes actuator 200 to rotate according to the well-known Lorentz relationship. As actuator 200 rotates, head 224 is moved radially across the data track along an arcuate path.

Figure 3A:
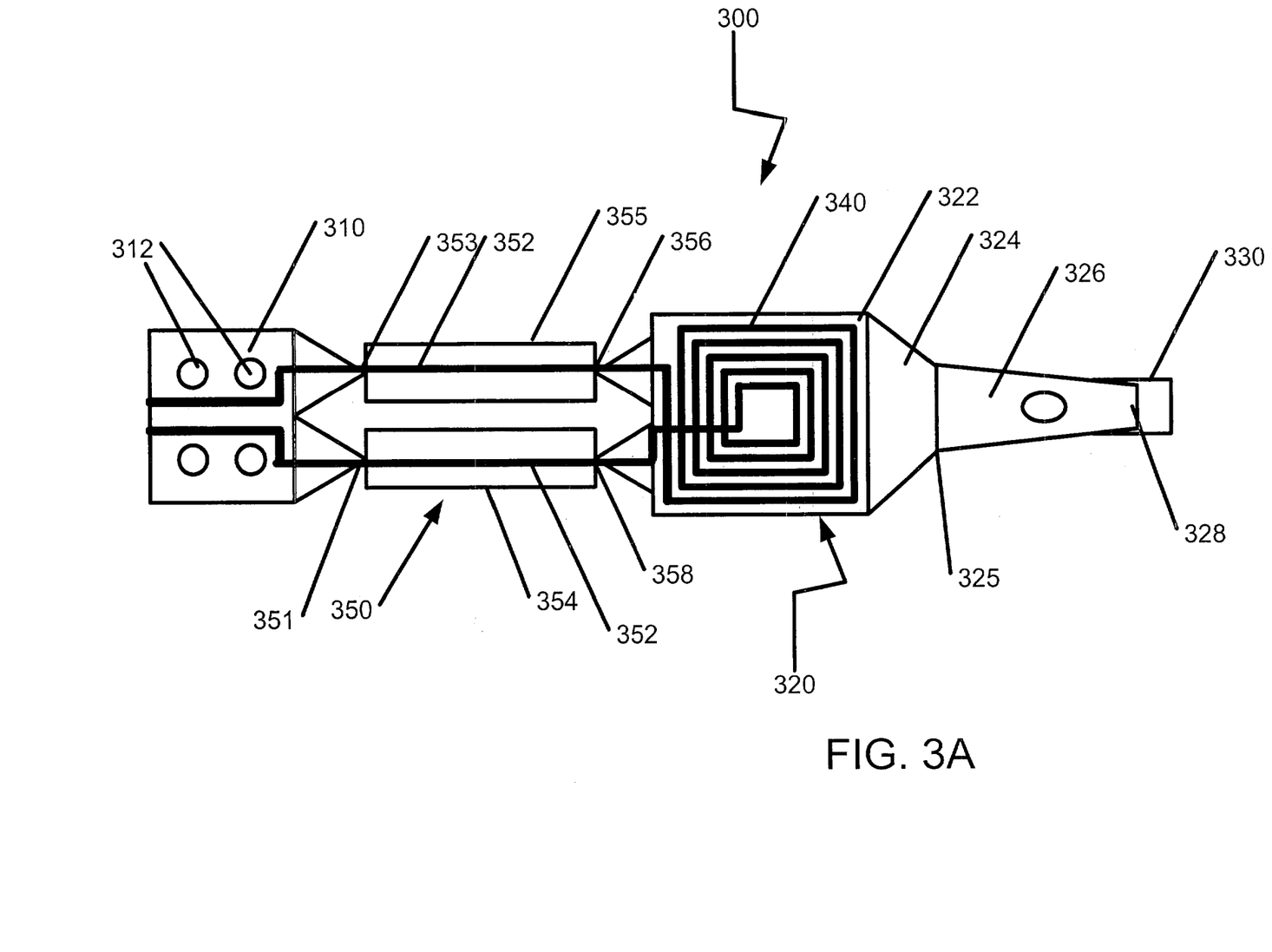
FIGS. 3A and 3B are diagrammatic illustrations of an actuator according to one illustrative embodiment of the present invention.

FIG. 3A is a diagrammatic illustration of an actuator 300 according to one illustrative embodiment of the present invention. Actuator 300 includes an anchor 310, a suspension 320, an actuation component 340 and a spring member 350. Anchor 310 includes multiple anchor holes 312 that are provided to assist in the attachment of actuator 300 to the disc housing (not illustrated). However, depending upon the method used to attach actuator 300 to the disc housing, anchor 310 may not have anchor holes 312.

Suspension 320 includes a base portion 322, a pre-load region 324, head support arm 326, a gimbal 328 and a slider/data head 330. The slider/data head 330 is configured to read data from and write data to the tracks on disc 106. Base portion 322 is connected to spring member 350 at a second end 356, 358 of each of the spring member 350. Base portion 322 provides a base or a flat surface upon which actuation component 340 can be attached. Actuation component 340 is shown in FIG. 3A as a voice coil. However, other actuation components can be attached to base portion 322, such as a magnet. Actuation component 340 is configured to receive a controlled direct current from controller 128. The current is provided to actuation component 340 via leads 352. Leads 352 can be independent leads or they can be integrated into a flexible cable attached to data head 330. However, other formats for providing the controlled DC current to actuation component 340 can be used.

Continuing from base portion 322 towards data head 330, a pre-load region 324 is manufactured into suspension 320. Pre-load region 324 provides a loading force (in the direction toward the disc surface) that counteracts the hydrodynamic forces created by data head 330 when the drive 100 is in operation. Attached to a distal end 325 of pre-load region 324 is a head support arm 326. Head support arm 326 supports data head 330 over the disc surface. Further, head support arm 326 helps transfer the pre-load force of the pre-load region 324 to the data head 330. Attached at the end of head support arm 326 is gimbal portion 328. Gimbal portion 328 provides the mount for data head 330 to attach to head support arm 326. Gimbal portion 328 is compliant and allows data head 330 to pitch and roll about an axis and further allows head 330 to move in response to minor variations in the surface of disc 106. Gimbal portion 328 also assists in stiffening head 330 in yaw and inplane axis motions and provides for positioning of data head 330's transducer (not illustrated separately) relative to data recorded on disc 106.

Figure 3B:
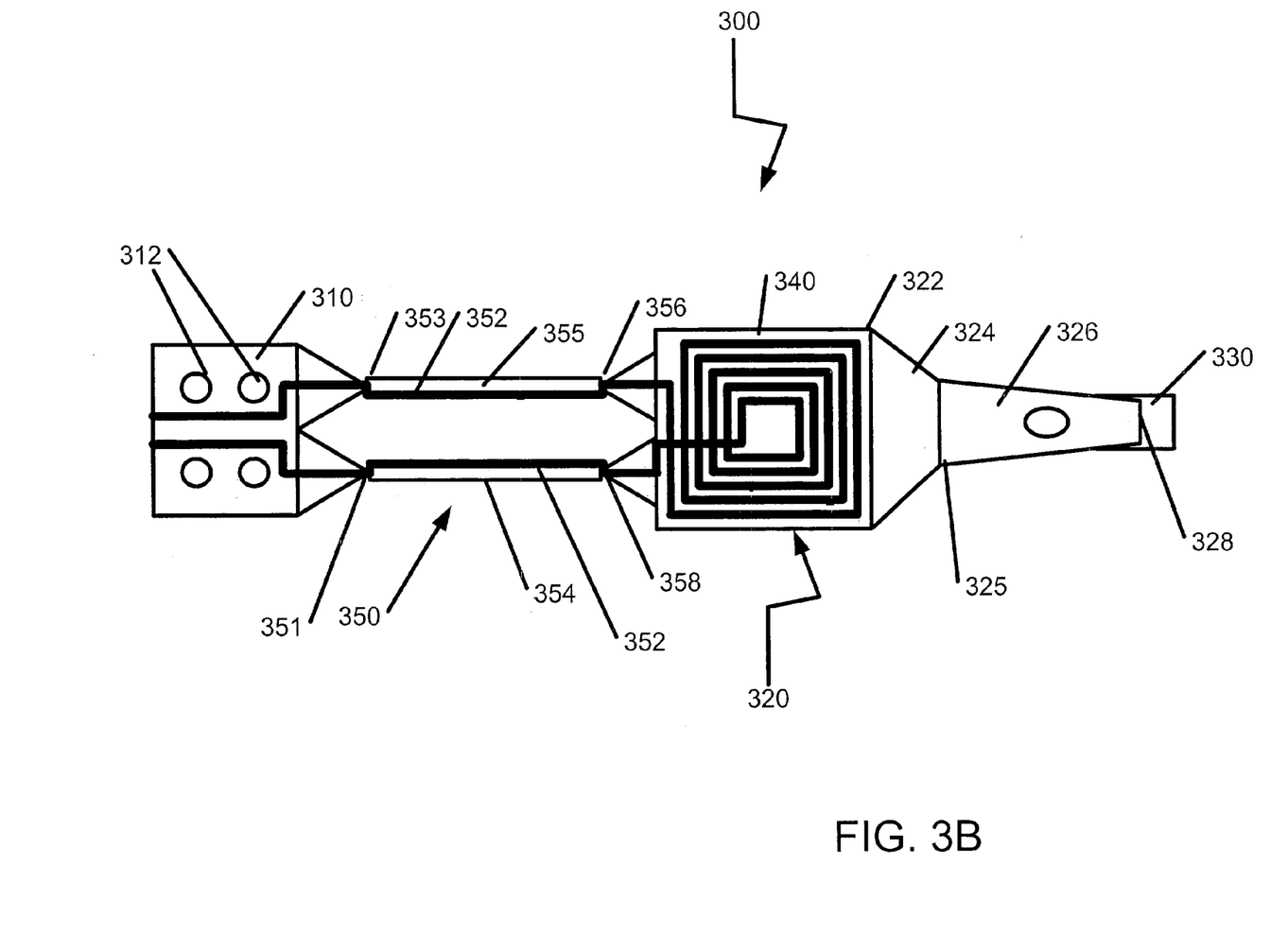

Spring member 350 is located between and connected to anchor 310 and suspension 320. In the embodiment illustrated in FIG. 3A spring member 350 includes two spring arms 354, 355. Spring arms 354, 355 are generally parallel to each other and form a bridge between anchor 310 and suspension 320. The first end 351, 353 of spring arms 354, 355 is connected to anchor 310, and a second end 356, 358 of spring arms 354, 355 is attached to suspension 320. Following initial manufacturing of actuator 300 spring arms 354, 355 are bent out of plane as shown in FIG. 3B. Leads 352 are carried from controller 128 to actuation component 340 along spring arms 354, 355.

Anchor 310 is mounted to the drive housing through the use of the anchor holes 312. Bolts, screws or other fasteners can be inserted through anchor holes 312 to secure anchor 310, and thus actuator 300 is fixedly attached to the drive housing. However, other methods of fastening or mounting actuator 300 to the drive housing can be used, such as spot welding or adhesives.

Spring arms 354, 355, as shown in FIGS. 3A and 3B are parallel to each other and are configured to provide a biasing force that counteracts an applied actuation force generated when current is provided to actuation component 340. The degree to which spring arms 354, 355 are bent out of plane, as well the thickness of spring arms 354, 355 is dependent upon the desired flexibility or desired biasing force for a particular application. In one embodiment spring arms 354, 355 are bent out of plane such that they are perpendicular to the surfaces of anchor 310 and suspension 320. Further, the thickness of spring arms 340 is approximately 200 microns. However, depending on the needs of the application other angles can be used when bending spring arms 334, 355. Further, other thicknesses can be used. Further still, spring arms 354 and 355 can be bent to different angles from each other.

Figure 4:
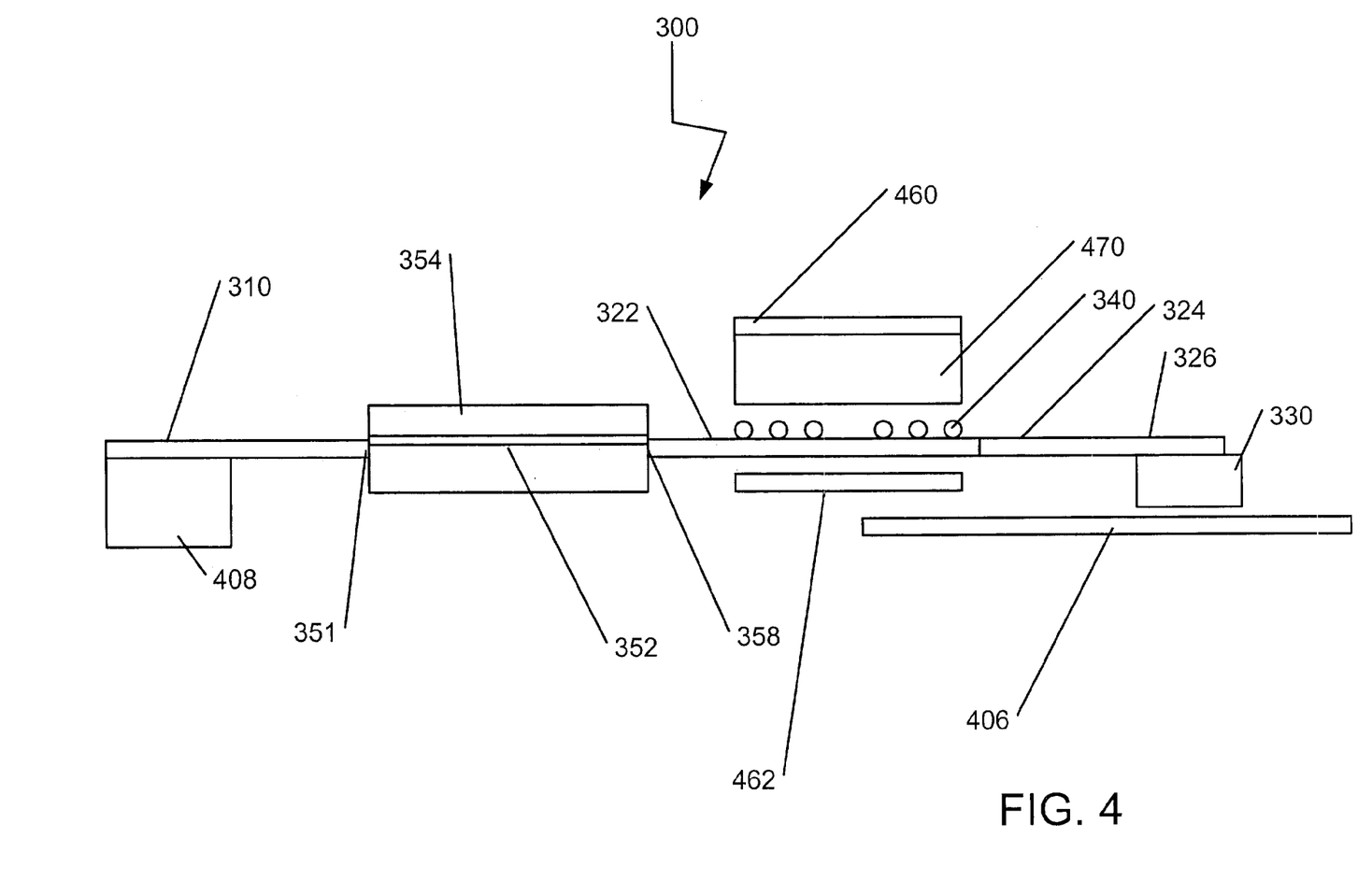
FIG. 4 is a diagrammatic illustration of a profile view of the actuator illustrated in FIG. 3B.

FIG. 4 is a diagrammatic illustration of a profile view of actuator 300 as shown in FIG. 3B. The arrangement illustrated in FIG. 4 is similar to the arrangement illustrated in FIGS. 3A and 3B, therefore, reference numbers used in FIG. 4 that are the same as reference numbers used in FIGS. 3A and 3B identify the same or similar features. FIG. 4 further shows actuator 300 coupled to a disc drive housing 408. Also shown in FIG. 4 are keepers or magnetic shields 460 and 462, magnet 470, and storage media 406.

Magnet 470 is disposed above the voice coils of actuation component 340. In some embodiments, storage media 406 is a magnetic media which could be erased by exposure to a magnetic field that is generated by magnet 470, and/or by the coils of actuation component 340. Therefore, magnetic shields 460 and 462 are provided on either side of magnet 470 to prevent the magnetic field generated by magnet 470 from interfering with the data stored on storage media 406 while allowing voice coil 340 to be exposed to the field. Shields 460 and 462 also prevent the magnetic field generated by coils of actuation component 340 from interfering with the data stored on storage media 406. In one embodiment, magnet 470 is a permanent magnet. However, other types of magnets can be used. Magnet 470 and shields 460 and 462 are connected to a portion of the disc drive, such as drive 100 embodiments using the non-rotary actuator 300 described herein, in any manner that allows actuator 300 to move freely in lateral motion in response to an applied actuation force. However, in other embodiments shield 462 can be attached to actuator 500.

Figure 5A:
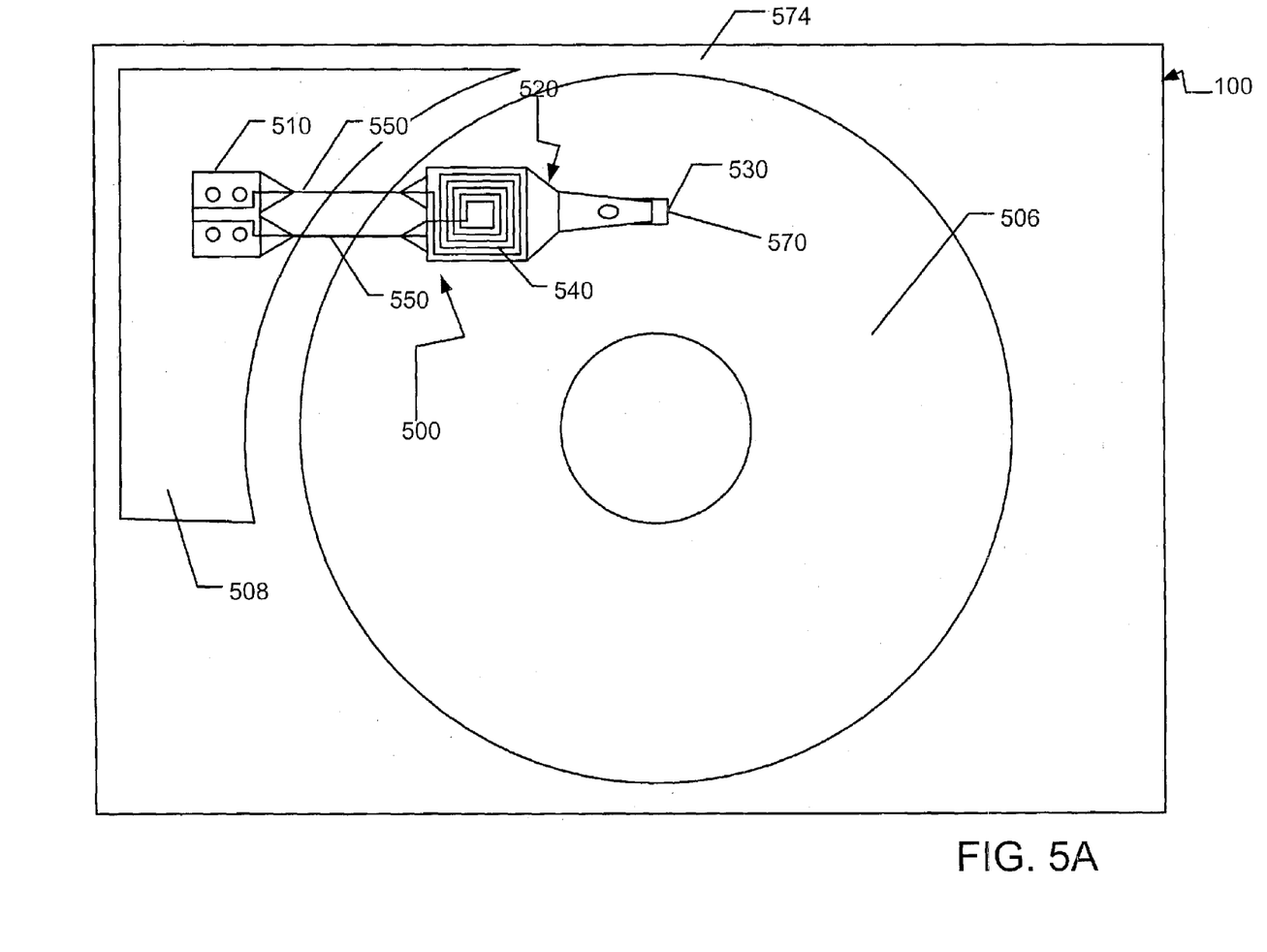
FIG. 5A is a diagrammatic illustration of an actuator as illustrated in FIGS. 3A, 3B and 4 installed in a disc drive.
Figure 5B:
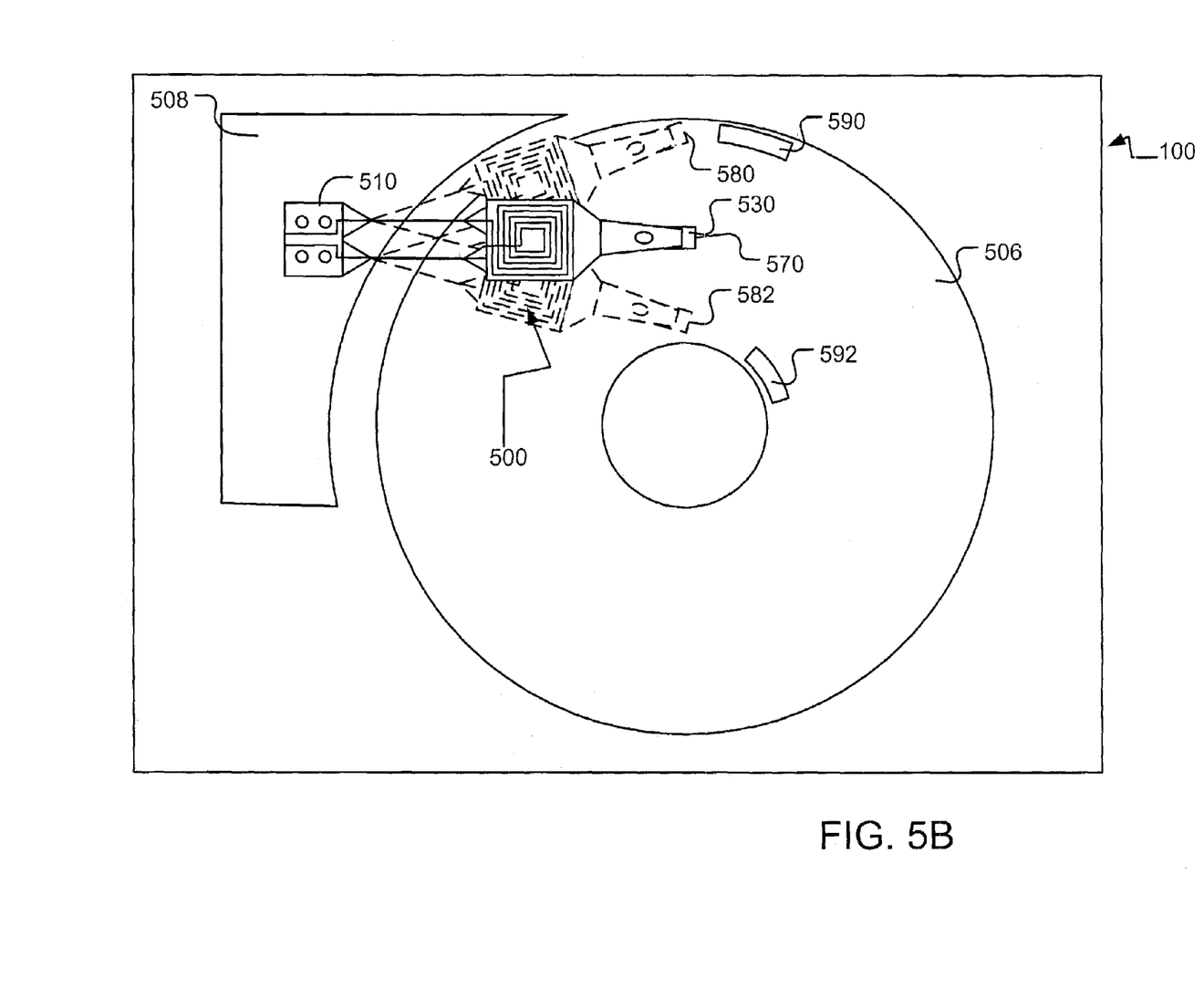
FIG. 5B is a diagrammatic illustration of the movement of the actuator in FIG. 5A during actuation.

Referring now to FIGS. 5A and 5B, a diagrammatic illustration of an actuator 500 installed in disc drive 100 is shown according the embodiment described in FIGS. 3A, 3B and 4 above. For purposes of clearer understanding, magnet 470 and keepers 460 and 462 are not illustrated in FIGS. 5A, 5B and 5C. However, those skilled in the art will appreciate that the location of the keepers 460 and the magnet 462 will include at least the arc of travel of actuation component 540.

FIG. 5A shows actuator 500, media disc 506, disc drive housing 508 and anchor 510. Actuator 500 is similar to the actuator 300 described in FIGS. 3A and 3B, and is shown fixedly attached to disc drive housing 508. Actuator 500 supports the data head 530 over storage media 506. Storage media 506 includes multiple data blocks, of which two of the data blocks, 590 and 592, are illustrated by way of example in FIG. 5B.

Referring now to FIG. 5A, actuator 500 is shown at its neutral or bias position 570. This neutral position 570 is the position that springs 550 are designed to bias data head 530 towards. While position 570 is shown approximately centered along a useable portion of storage media 506. Those skilled in the art will appreciate that actuator 500 can be biased to other locations relative to storage media 506.

In one embodiment of the present invention, actuator 500 remains at the bias position 570 when the disc drive is not in operation. In an alternative embodiment actuator 500 is stored at a location 574 at a distance away from the surface of storage media 506 so as to prevent data head 530 from crashing into storage media 506 and causing damage to the data contained therein, when the drive is not in operation. This can be achieved for example by moving actuator 500 to the edge of disc 506 and engaging a clip or a latch. Similarly, the bias position can be a location toward an inner diameter of storage media 506.

Referring now to FIG. 5B, actuator 500 is shown at bias position 570. However, when data is required to be accessed or written to positions inward or outward from the bias position 570, actuator 500 is controlled such that data head 530 can read data from or write data to storage media 506 at these other positions. Shown by example data blocks 590 and 592 are illustrations of positions inward and outward of bias position 570 which need to be accessed. When data blocks 590 and 592 are to be accessed, actuator 500 moves to position 580 or 582, respectively. Positions 580 and 582 are shown in phantom in FIG. 5B.

In order for actuator 500 to move from position 570 to either of positions 580 and 582, an actuation force must be applied to or generated by actuator 500. When actuation component 540 is a voice coil, the actuation force is generated by providing a controlled direct current to the leads 352. The result of this current is a magnet field formed surrounding the voice coil 540. This generated magnetic field interacts with the magnetic field generated by magnet 470. The interaction between voice coil 540 and permanent magnet 470 causes suspension 520 to move according to the Lorentz relationship. As suspension 520 moves, data head 530 moves radially across the storage media surface 506 along an arcuate path. The movement of suspension 520 in response to the actuation force is resisted by spring arms 550. Throughout the entire application of the actuation force, spring arms 550 are generating a force to encourage data head 530 and hence actuator 500 back towards position 570. It will be recognized by those skilled in the art that when the actuation force is applied to actuation component 540 and data head 530 is displaced, spring arms 550 expand and contract. Further, spring arms 550 can be designed such that each spring arm 550 can expand and contract independently of the other spring arm.

Figure 5C:
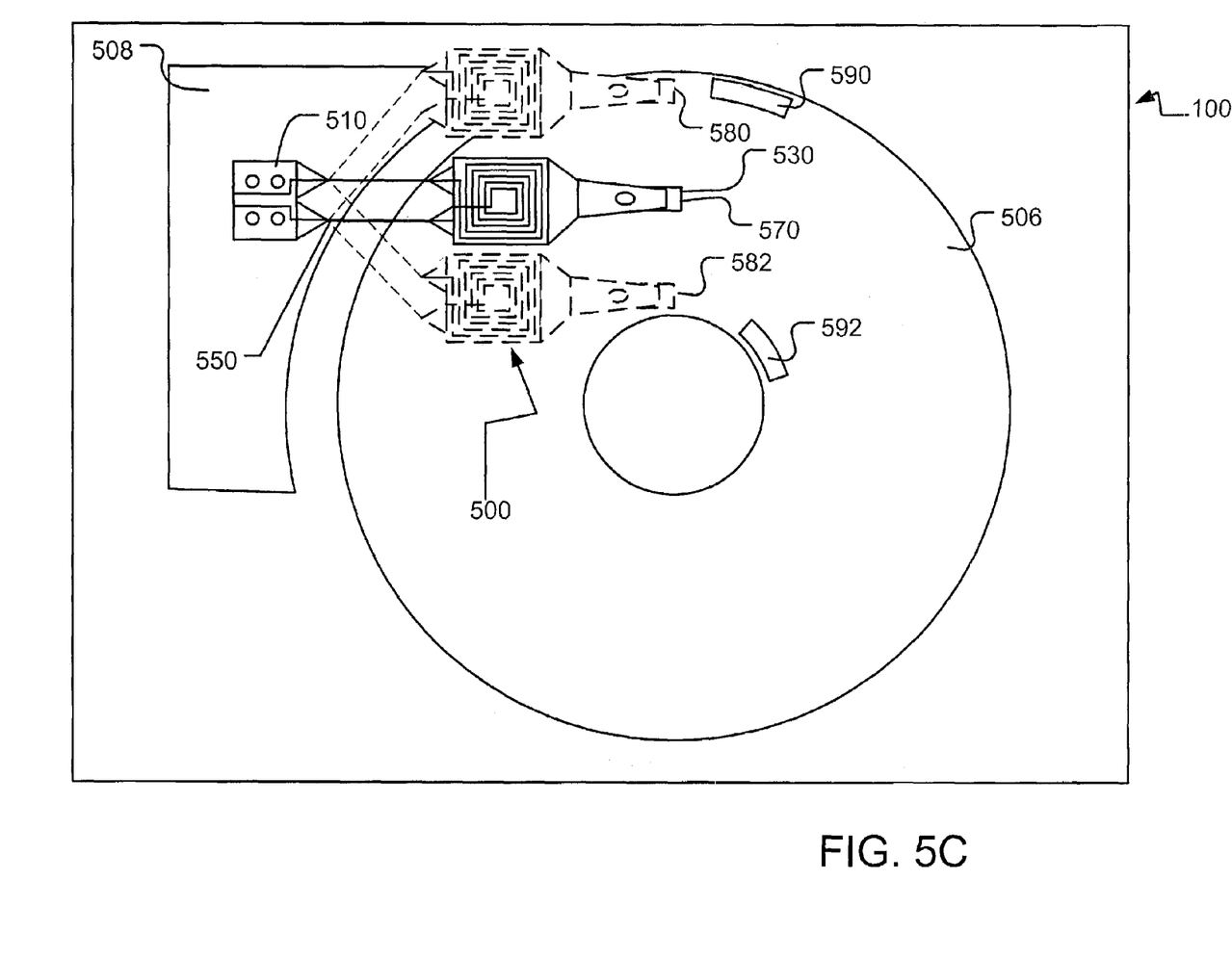
FIG. 5C is a diagrammatic illustration of the movement of the actuator in FIG. 5A during actuation according to an alternative embodiment.

In accordance with another embodiment of the actuator of anchor 500 spring arms 550 can bend in an "s-like" manner, as shown in FIG. 5C. In FIG. 5C, suspension 520 is displaced by the magnetic field generated by voice coil 540 and magnet 470. However, in contrast to the movement of suspension 520 in FIG. 5B, suspension 520 does not change its orientation relative to storage media surface 506. Most of the motion of suspension 520 is parallel to anchor 510. However, for large displacements there is some motion by suspension 520 towards anchor 510.

The movement of actuator 500 is governed by the spring constant (k) for the particular actuator. A certain current is provided to coils 540 to move actuator 500 a certain distance. The current required to move actuator 500 varies with the distance the actuator is required to move, and is dependent upon the spring constant for the spring arms of the actuator. Hence, a larger current is required to move actuator 500 a greater distance.

During the movement of actuator 500, anchor 510 holds the first end spring arms 550 relatively stationary to the drive housing 506. Those skilled in the art will appreciate that while actuator 500 is moved anchor 510 can move slightly relative to drive housing 506 due to variations in manufacturing tolerance.

In order to keep actuator 500 at selected track 590 or 592, a certain constant level of current is applied to coil 540. The amount of current which is required to be applied to coil 540 required to hold actuator 500, and hence data head 530, on the desired track is dependent upon characteristics of springs 550. However, the current supply provided to hold actuator 500 over the desired data track can vary slightly so as to correct for small errors in the tracking of data head 530, over disc 506.

Figure 6A:
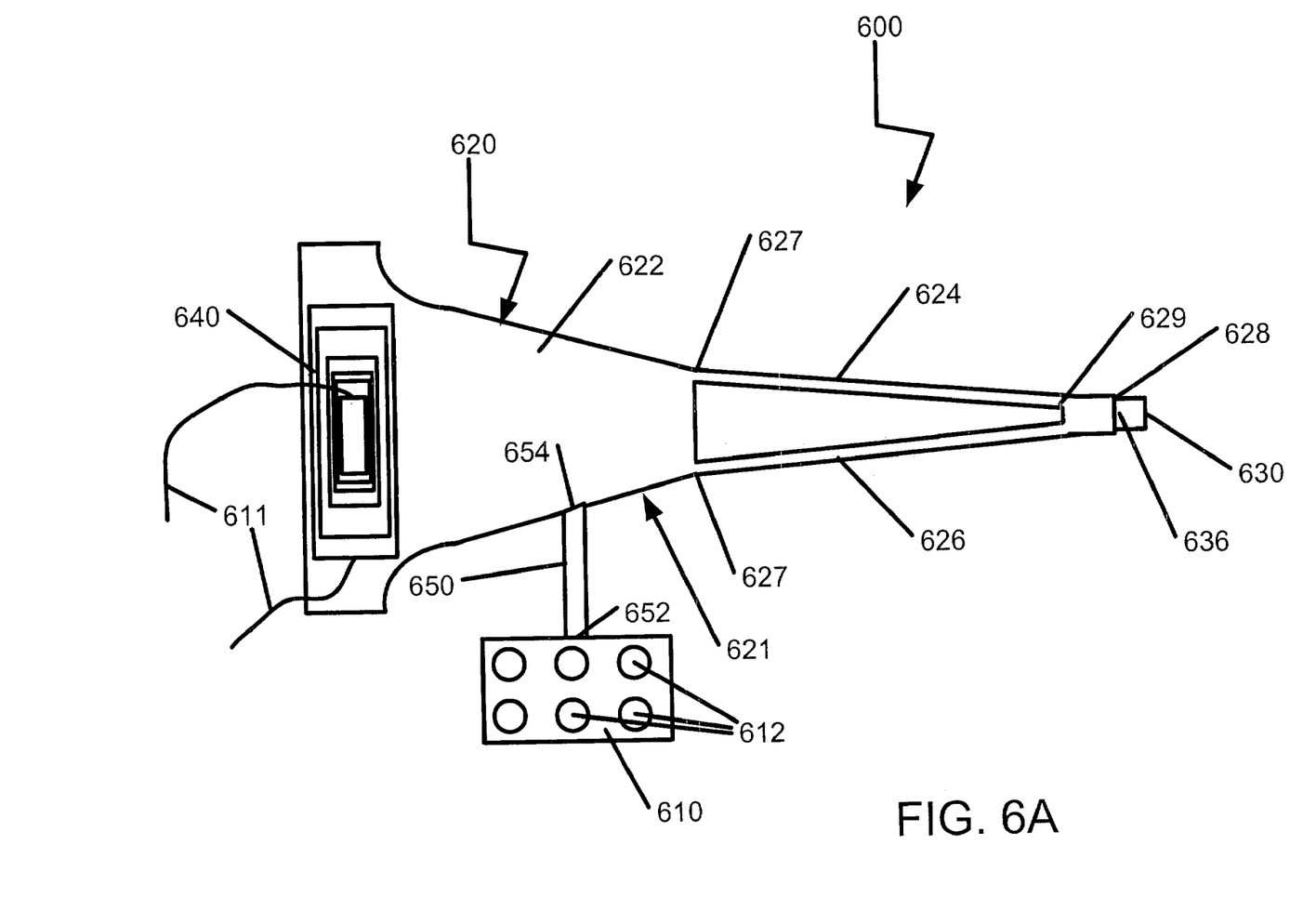
FIG. 6A is a diagrammatic illustration of an actuator according to one alternative embodiment of the present invention.

FIG. 6A is a diagrammatic illustration of actuator 600 according to one alternative embodiment of the present invention. Actuator 600 is includes an anchor 610, suspension 620 and a spring member 650.

Suspension 620 includes a base portion 622, support arms or beams 624 and 626, a head support area 628 and a data head 630. Data head 630 is coupled to head support area 628, and is compliant about gimbal portion 636. Head support area 628 supports data head 630 over a storage media, such as disc 106 (FIG. 1). Head support area 628 is connected to base portion 622 by support arms 624 and 626. Arms 624 and 626 extend from point 627 on base portion 622 to point 629 on head support area 628. Support arms 624 and 626 provide structural support to suspension 620, but do not provide resistance to an applied actuation force as in previously described embodiments. An actuation component 640 is deposited or attached to a portion of base portion 622. In one embodiment, actuation component 640 is located on a portion of the suspension that is opposite data head 630. However, other locations on suspension 620 can be used. In the embodiment in FIG. 6A actuation component 640 is illustratively shown as a voice coil located on the portion of the suspension opposite data head 630. However, other methods and arrangements can be used for actuation component 640.

Anchor 610 couples actuator 600 to a disc housing 608 (FIG. 6B) of disc drive 100 through the use of anchor holes 612. In one embodiment anchor 610 is fastened to disc housing 608 by fasteners that are inserted through anchor holes 612. However, other types of fastening or attachment can be used, such as gluing or spot welding.

Spring member 650 is disposed between suspension 620 and anchor 610. Spring member 650 is connected to suspension 620 at point 654, and is coupled to anchor 610 at point 652. Point 654 is located on side 621 of suspension 620 and is also located between actuation component 640 and head support area 628. However, other locations can be used depending on the needs of the application. Spring member 650 is a resilient member and provides a biasing force that counteracts an applied actuation force generated by actuation component 640. During actuation, suspension 620 pivots or rotates about coupling/pivot point 652. The movement of suspension 620 about pivot point 652 is shown diagrammatically in phantom at positions 680 and 682 in FIG. 6B. It should be noted that while the rotation of suspension 620 is shown about pivot point 652 those skilled in the art will realize that the rotation of suspension 620 is generally about connection point 652. However, the rotation of suspension 620 can be about point 654.

Figure 6B:
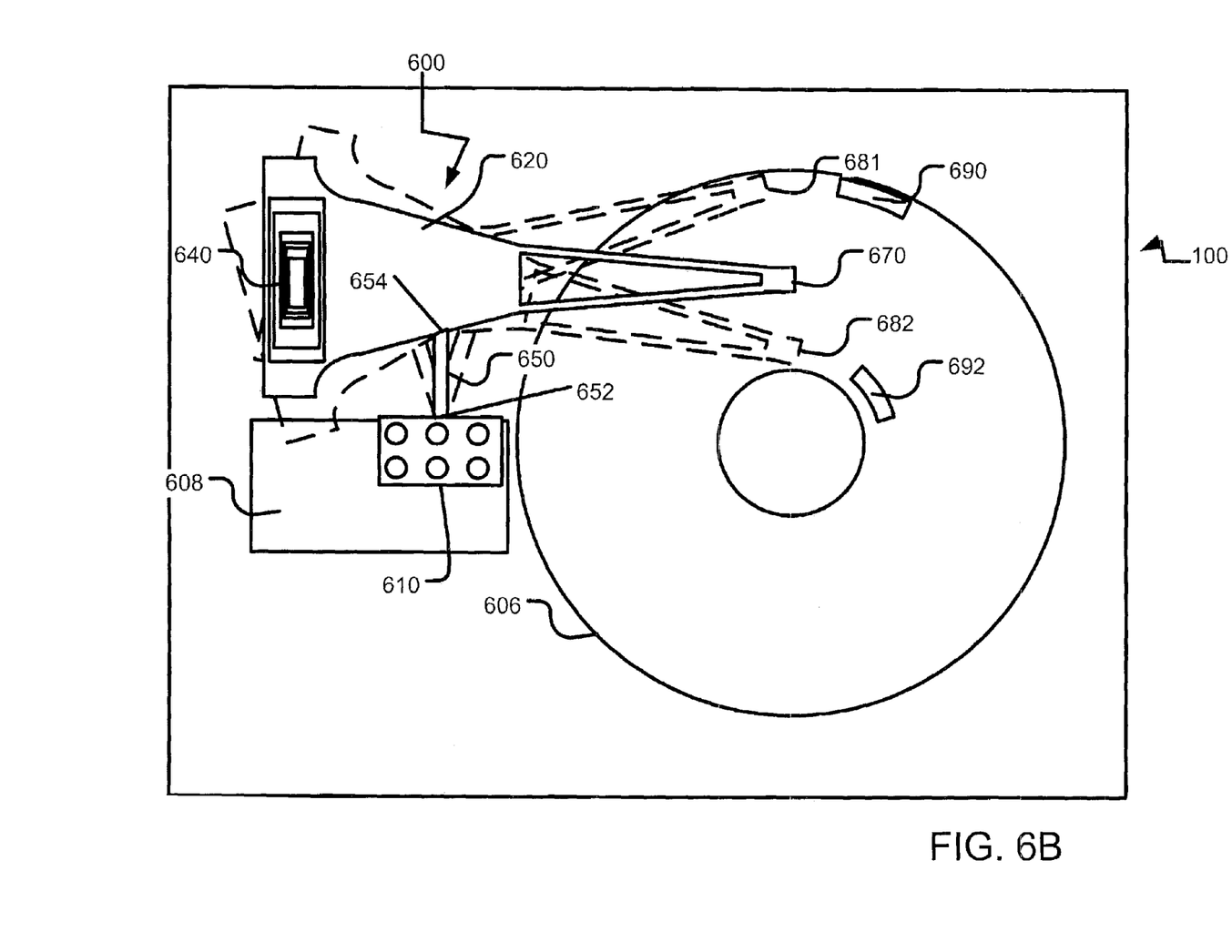
FIG. 6B is a diagrammatic illustration of the movement of the actuator in FIG. 6A during actuation.

The movement or rotation of suspension 620 about pivot 652 can be explained with reference to the following example as illustrated in FIG. 6B. Assuming actuator 600 is commanded to access data block 690 or 692 on disc 606. An actuation force is generated by actuation component 640, by providing a current to actuation component 640 through flexible wires 611 (FIG. 6A). In response to this actuation force, suspension 620 rotates about point 652 and head 630 moves towards data block 690 or 692 such that block 690 or 692 can be accessed by data head 630. At the same time, spring member 650 provides a biasing force in a direction opposite the direction of rotation of suspension 620. The amount of the biasing force generated by spring 650 is dependent upon its spring constant (k), which can be selectively determined when the actuator 600 is designed for the specific application and the desired displacement. When the actuation force is removed spring member 650 biases suspension 620 back towards a neutral position of 670.

Figure 7:
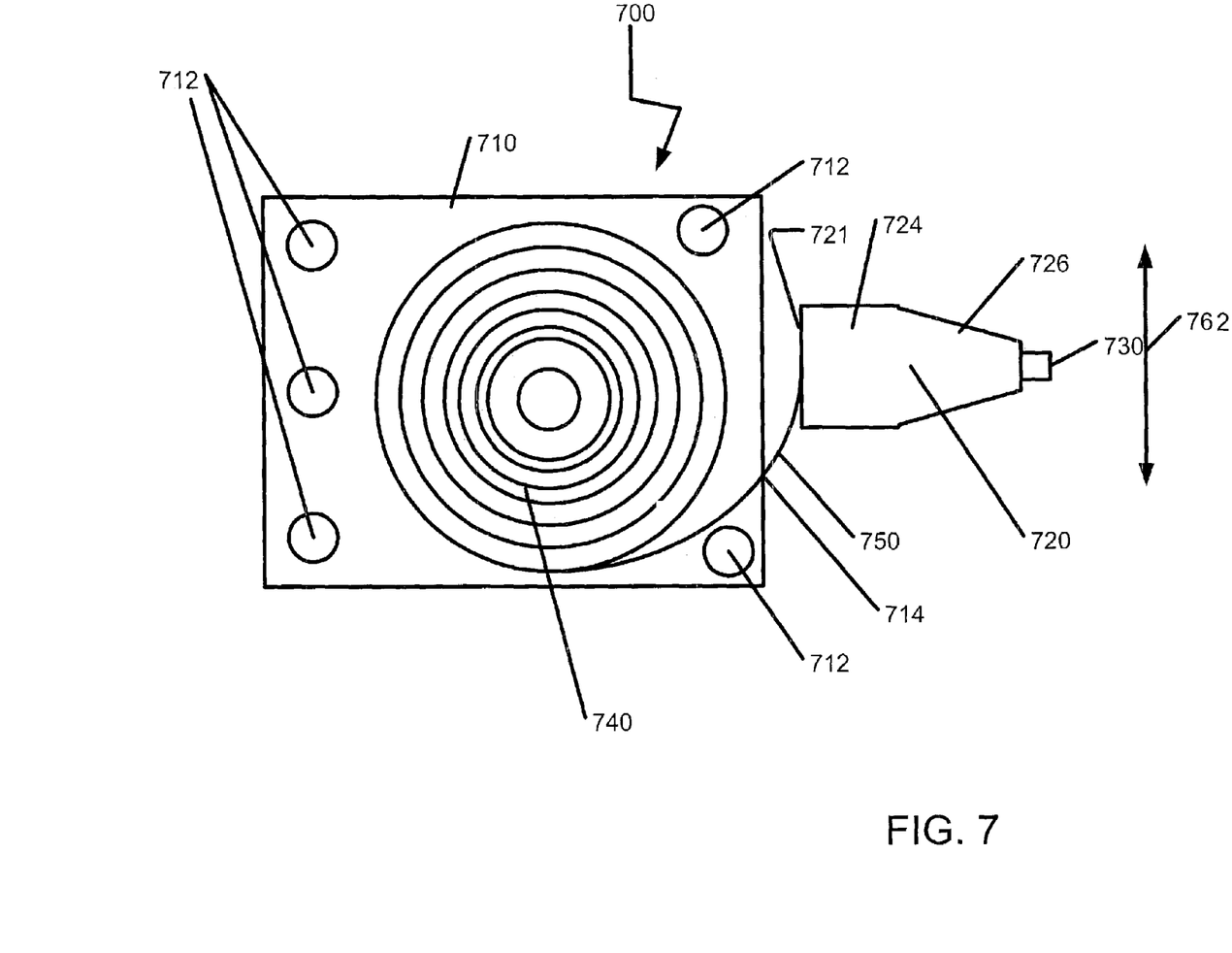
FIG. 7 is a diagrammatic illustration of an actuator having an integrated actuation component and spring member in accordance with an alternative embodiment of the present invention.

FIG. 7 is a diagrammatic illustration of an actuator 700 in accordance with yet another alternative embodiment of the present invention. Actuator 700 includes an anchor 710, a suspension 720, a spring member 750 and an actuation component 740. Suspension 720 includes a pre-load region 724, a head support arm 726 and a data head 730. Pre-load region 724 provides a downward force that counteracts the hydrodynamic forces created by data head 730 during disc drive operations to achieve a desired fly height.

Anchor 710 connects actuator 700 to a drive housing of disc drive 100. Anchor 710 is attached to the disc housing with fasteners, which are inserted through anchor holes 712. However, other methods of attachment can be used such as adhesives or spot welding. Actuation component 740 is disposed on anchor 710. In the embodiment shown in FIG. 7 actuation component 740 is a voice coil. However, actuation component 740 can be any other actuation component having spring-like properties. A portion of actuation component 740 extends beyond edge 714 of anchor 710. The portion of actuation component 740 that extends beyond anchor edge 714 comprises the spring member 750 of actuator 700. Spring member 730 connects to a rear portion 721 of suspension 720.

Operation and movement of actuator 700 can be explained with reference to the following description. Actuator 700 is configured to move data head 730 over a data block on disc 106 (FIG. 1) when actuator 700 is commanded by a controller 128 (FIG. 1) to access the specified data block. A permanent magnet is disposed over the actuation component 740 and generates a magnetic field. An electric current is provided to both actuation component 740 and spring member 750. This applied current interacts with the magnetic field such that the coils that comprise the actuation component 740 either expand or contract, depending on the field generated by the current and its interaction with the magnetic field. As actuation components 740 expands or contracts spring member 750 accordingly expands or contracts accordingly. This expansion and contraction results in movement of data head 730 relative to anchor 710 and disc 106 (FIG. 1). The movement of both suspension 720 and data head 730 is shown generally by arrow 762 in FIG. 7, though the movement can be arcuate and need not be linear. The amount of the expansion and/or contraction required to move data head 730 is proportional to the length of coil 740 and spring member 750. In other words the longer coil 740 is the greater the movement of head 730 will be.

In summary one embodiment of the present invention is directed to a solid-state actuation mechanism (300, 500, 600, 700) for use in a data storage system (100). The actuation mechanism (300, 500, 600, 700) includes an anchor (310, 510, 610, 710), a spring member (350, 550, 660, 750) including a first end coupled to the anchor (310, 510, 610, 710), and a suspension (320, 520, 620, 720) coupled to a second end of the spring member (350, 550, 650, 750). The anchor (310, 510, 610, 710) is fixedly attached to a housing (408, 508, 608) of the data storage system (100). The suspension (320, 520, 620, 720) supports a data head (330, 530, 630, 730) above a media surface (106, 406, 506, 606), and the suspension (320, 520, 620, 720) is biased by the spring member toward a first position (570, 670). Further, an actuator component (340, 540, 640, 740) is coupled to the suspension (320, 520, 620, 720). The actuator component (340, 540, 640, 740) is configured to apply an actuation force to the suspension (320, 520, 620, 720) to move the suspension (320, 520, 620, 720) laterally relative to the media surface (106, 406, 506, 606). The spring member (350, 550, 650, 750) of the actuation mechanism (300, 500, 600, 700) can include two arms (354, 355) extending from the anchor to the suspension (320, 520, 620, 720). The two arms (354, 355) are spaced apart from each other, and are configured to bend laterally relative to the media surface (106, 406, 506, 606) in response to the applied actuation force.

Another embodiment of the present invention is directed to solid-state actuator (300, 500, 600, 700) having an anchor (310, 510, 610, 710), a spring member (350, 550, 650, 750), and a suspension (320, 520, 620, 720). The spring member (350, 550, 650, 750) is coupled to the anchor (310, 510, 610, 710) at a first end and to the suspension (350, 550, 650, 750) at a second end. An actuation component (340, 540, 640, 740) is attached to the proximal end of the suspension (350, 550, 650, 750), and provides an actuation force to move the suspension (350, 550, 650, 750) laterally. Further the spring member (350, 550, 650, 750) biases the suspension (350, 550, 650, 750) to a first position (570, 670).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the actuation mechanism while maintaining substantially the same functionality without departing from the scope and spirit of the present invention. In addition, although the preferred embodiment described herein is directed to a actuation mechanism for a disc drive, it will be appreciated by those skilled in the art that the teachings of the present invention can be applied to other storage mediums using actuators, without departing from the scope and spirit of the present invention.

What is claimed is:

1. An actuation mechanism, comprising:
   an anchor fixedly attached to a structure;
   a spring member having a first end coupled to the anchor;
   a suspension coupled to a second end of the spring member, the suspension supporting a device above a surface, the suspension being biased by the spring member toward a first position; and
   an actuator component coupled to the suspension, and configured to apply an actuation force to the suspension to move the suspension laterally relative to the surface.

2. The actuation mechanism of claim 1 wherein the first end of the spring member is stationary relative to the structure.

3. The actuation mechanism of claim 1 wherein the spring member further comprises two arms extending from the anchor to the suspension, the two arms spaced apart from each other.

4. The actuation mechanism of claim 3 wherein the two arms are configured to bend laterally relative to the surface in response to the applied actuation force.

5. The actuation mechanism of claim 3 wherein the actuator component includes a coil attached to a side of the suspension opposite a side facing the surface.

6. The actuation mechanism of claim 2 wherein the spring member, anchor, and suspension are formed from a unitary piece of material.

7. The actuation mechanism of claim 1 wherein the coupling between the spring member and the suspension is at a coupling point on a side of the suspension.

8. The actuation mechanism of claim 7 wherein the coupling point generally defines a pivot axis about which the suspension pivots in response to the applied actuation force.

9. The actuation mechanism of claim 8 wherein the coupling point is located between the actuator component and the device.

10. The actuation mechanism of claim 9 wherein the actuator component is disposed at a first end of the suspension and the device is disposed at a second end of the suspension.

11. The actuation mechanism of claim 1 wherein the actuator component is disposed on a portion of the anchor.

12. The actuation mechanism of claim 11 wherein the actuator component comprises a voice coil.

13. The actuation mechanism of claim 12 wherein a portion of the coil supports the suspension over the surface.

14. The actuation mechanism of claim 1 wherein the structure is a housing of a data storage system, the surface is a media surface and the device is a data head.

15. An actuator comprising:
    an anchor;
    a spring member having a first end coupled to the anchor;
    a suspension coupled to a second end of the spring member, the suspension having a proximal end and a distal end;

an actuation component coupled to the proximal end of the suspension;

wherein the actuation component is configured to apply an actuation force to the suspension to move the suspension laterally relative to a plane defined by the anchor and the suspension; and wherein the spring member biases the suspension to a first position.

16. The actuator of claim 15 wherein the first end of the spring member is stationary relative to the suspension.

17. The actuator of claim 15 wherein the spring member comprises two arms extending from the anchor to the suspension, the two arms spaced apart from each other.

18. The actuator of claim 17 wherein the actuation component includes a coil attached to the suspension.

19. The actuator of claim 17 wherein the anchor, the spring member, and the suspension are formed from a unitary piece of material.

20. The actuator of claim 15 wherein the coupling between the spring member and the suspension is at a coupling point on a side of the suspension located between the proximal and distal ends of the suspension.

21. The actuator of claim 20 wherein the coupling point generally defines a pivot axis about which the suspension pivots in response to the applied actuation force.

22. The actuator of claim 15 wherein the actuation component is disposed on a portion of the anchor.

23. The actuator of claim 22 wherein the actuation component comprises a voice coil.

24. The actuator of claim 23 wherein a portion of the actuation component comprises the spring member.

25. The actuator of claim 17 wherein the two arms are configured to bend laterally in response to the applied actuation force.

26. The actuator of claim 17 wherein the two arms are configured to expand or contract independently of each other in response to the applied actuation force.

27. The actuator of claim 17 wherein a portion of each of the two arms extends outside a plane defined by major surfaces of the anchor and the suspension.

28. The actuator of claim 17 wherein the two arms are coupled to a first end of the suspension, and a data head is disposed at a second end of the suspension.

29. The actuator of claim 17 wherein the actuator component includes a magnet attached to a side of the suspension.

* * * * *

UNITED STATES PATENT AND TRADEMARK OFFICE
CERTIFICATE OF CORRECTION

PATENT NO. : 7,151,649 B2 Page 1 of 1
APPLICATION NO. : 10/358831
DATED : December 19, 2006
INVENTOR(S) : Boutaghou et al.

It is certified that error appears in the above-identified patent and that said Letters Patent is hereby corrected as shown below:

Column 4, line 22, delete "Is".
Column 7, line 42, delete "is".

Signed and Sealed this

Tenth Day of April, 2007

JON W. DUDAS
*Director of the United States Patent and Trademark Office*